United States Patent
Raspone et al.

(10) Patent No.: US 12,479,704 B2
(45) Date of Patent: Nov. 25, 2025

(54) TRANSPORT SYSTEMS FOR OBJECTS IN INDUSTRIAL PLANTS

(71) Applicant: GEICO S.p.A., Cinisello Balsamo (IT)

(72) Inventors: Daniel Raspone, Cinisello Balsamo (IT); Valerio Iglio, Cinisello Balsamo (IT)

(73) Assignee: GEICO S.p.A., Cinisello Balsamo (IT)

( * ) Notice: Subject to any disclaimer, the term of this patent is extended or adjusted under 35 U.S.C. 154(b) by 202 days.

(21) Appl. No.: 18/273,965

(22) PCT Filed: Jan. 25, 2022

(86) PCT No.: PCT/IB2022/050627
§ 371 (c)(1),
(2) Date: Jul. 24, 2023

(87) PCT Pub. No.: WO2022/162523
PCT Pub. Date: Aug. 4, 2022

(65) Prior Publication Data
US 2024/0409378 A1   Dec. 12, 2024

(30) Foreign Application Priority Data

Jan. 26, 2021   (IT) .......................... 102021000001391

(51) Int. Cl.
*B62D 65/18* (2006.01)
*B66F 9/06* (2006.01)
*B66F 9/20* (2006.01)

(52) U.S. Cl.
CPC .............. *B66F 9/063* (2013.01); *B62D 65/18* (2013.01); *B66F 9/20* (2013.01)

(58) Field of Classification Search
CPC ............. B66F 9/063; B66F 9/20; B62D 65/18
(Continued)

(56) References Cited

U.S. PATENT DOCUMENTS 12,351,391 B1 * 7/2025 Somavar Muniappan ................. B65G 1/1378
2019/0276238 A1 * 9/2019 Dudek ................... B65G 13/06
(Continued)

FOREIGN PATENT DOCUMENTS

| JP | H08268538 A | 10/1996 |
| WO | 2020/233962 A1 | 11/2020 |

OTHER PUBLICATIONS

International Search Report and Written Opinion in International Application No. PCT/IB2022/050627 mailed on Apr. 12, 2022, 13 pages.
(Continued)

*Primary Examiner* — Gene O Crawford
*Assistant Examiner* — Lester Rushin, III
(74) *Attorney, Agent, or Firm* — MH2 TECHNOLOGY LAW GROUP LLP

(57) ABSTRACT

A transport system for an industrials plant may include: at least one trolley configured to autonomously transport an object; at least one skid configured to support the object; and at least one station configured to load the at least one skid onto the at least one trolley and configured to unload the at least one skid off of the at least one trolley. The at least one trolley may include: a motorized handling platform; a motorized lifting system; and a roller table equipped with first rollers. The roller table may be supported on the motorized lifting system so as to move on command between a raised position and a lowered position on the at least one trolley. The roller table may be configured to support the at least one skid resting on the first rollers.

18 Claims, 3 Drawing Sheets

(58) Field of Classification Search
USPC .................................................. 198/465.1
See application file for complete search history.

(56) References Cited

U.S. PATENT DOCUMENTS

| 2020/0290814 | A1* | 9/2020 | Diehr | B65G 41/003 |
| 2020/0338739 | A1* | 10/2020 | Freire | B25J 9/1687 |
| 2023/0038619 | A1* | 2/2023 | Marshall | B66F 9/19 |

OTHER PUBLICATIONS

Geico Taikisha: "J-Rover", Aug. 4, 2020, pp. 1-3, XP054982326, retrieved from the internet: URL:https://www.youtube.com/watch?v=Dn4mdG6ITQ0 [retrieved on Oct. 7, 2021], the whole document.

* cited by examiner

TRANSPORT SYSTEMS FOR OBJECTS IN INDUSTRIAL PLANTS

CROSS-REFERENCE TO RELATED APPLICATION(S)

This application is a national stage entry from International Application No. PCT/IB2022/050627, filed on Jan. 25, 2022, in the Receiving Office ("RO/IB") of the World Intellectual Property Organization ("WIPO"), published as International Publication No. WO 2022/162523 A1 on Aug. 4, 2022. International Application No. PCT/IB2022/050627 claims priority under 35 U.S.C. § 119 from Italian Patent Application No. 102021000001391, filed on Jan. 26, 2021, in the Italian Patent and Trademark Office ("IPTO"), the entire contents of all of which are incorporated herein by reference.

The present invention relates to an innovative transport system in particular for motor vehicle bodies, in industrial plants.

In industrial plants of the prior art often conveyors of the sequential type are used, these being constructed with long chain sections and/or motorized rollers on which suitable supports called "skids", in turn supporting the objects to be transported, are placed and made to move. In particular, the skids are widely used in plants for the production of motor vehicles or motor vehicle parts. Sequential conveyors have, however, the drawback that they may be used only along clearly predefined travel paths.

These systems are useful, therefore, when the sequential movement of all the objects on the conveyor must proceed in a synchronized manner, namely with the objects which all move forwards by the same amount and along the clearly predefined travel path, for example so as to transport the object on the skid inside treatment tanks, painting booths, etc.

In the case where more complex transporting movements must be performed, for example along travel paths which are not strictly predefined or which may be varied with corresponding ease if required, it instead becomes necessary to use more complex transport systems such as systems with autonomous motorized trolleys, also called AGV (Automated/Automatic Guided Vehicles).

These AGV transport systems comprise one or more automatic transport trolleys which may move by means of wheels on a floor surface and may therefore be programmed to follow the desired travel paths. The object to be transported is thus placed on the AGV trolley which transports it to the destination along paths which may also be complex and/or variable.

The AGV systems require, however, stations with motorized systems for loading and unloading the transported object, which may complicate management of the plant.

Moreover, in some parts of a plant AGV transport systems may be more suitable and in other parts of the same plant skid-type sequential transport systems may be even more suitable and therefore there is the need to transfer the objects between the AGV trolleys and the skids on the sequential transport system. Also such a transfer requires suitable stations with motorized systems for performing loading and unloading between the two transport systems. These stations are complicated also because the transfer must be performed with precision between the supports on the AGV trolley and the supports present on the skids. The complexity of managing these transfers is such that in the prior art it is preferred to minimize the need to perform transfers between one transport system and another and this results in a non-optimal use of the different characteristics of the two transport systems, since often there is a tendency to limit the combined use of the two systems and it is preferred not to use, for example, in one part of the plant the most suitable system of the two, so as not to have to deal with the problems caused by transfer from one system to another in this plant part.

The general object of the present invention is to provide a transport system which allows easier interfacing between AGV-type transport systems and skid systems and which allows easier loading and unloading of the objects to be transported, in particular motor vehicle bodies.

In view of this object, the idea which has occurred is to provide, according to the invention, a transport system for industrial plants comprising at least one trolley for the autonomous transport of an object and at least one skid intended to support the object to be transported and at least one station for loading/unloading the skid onto and from the trolley, characterized in that the trolley comprises an AGV-type motorized handling platform, a motorized lifting system and a roller table equipped with rollers, the roller table being supported on the motorized lifting system so as to move on command between a raised position and a lowered position on the trolley, and the roller table being intended to support a skid resting on the rollers.

Still in view of this object the idea which has occurred is to provide the single trolley for the autonomous transport of objects, comprising an AGV-type motorized handling platform, characterized in that it comprises above the motorized platform a motorized lifting system and a roller table equipped with rollers, the roller table being supported on the motorized lifting system so as to move on command between a raised position and a lowered position, the roller table being intended to support a skid resting on the rollers and supporting in turn the object to be transported, the rollers being or not being at least partly motorized.

The AGV-type autonomous trolley according to the invention allows easy transfer of skids in an industrial plant and may interface easily also with skid-type sequential conveyors.

In order to illustrate more clearly the innovative principles of the present invention and its advantages compared to the prior art, examples of embodiment applying these principles will be described below with the aid of the attached figures.

Figure 1:
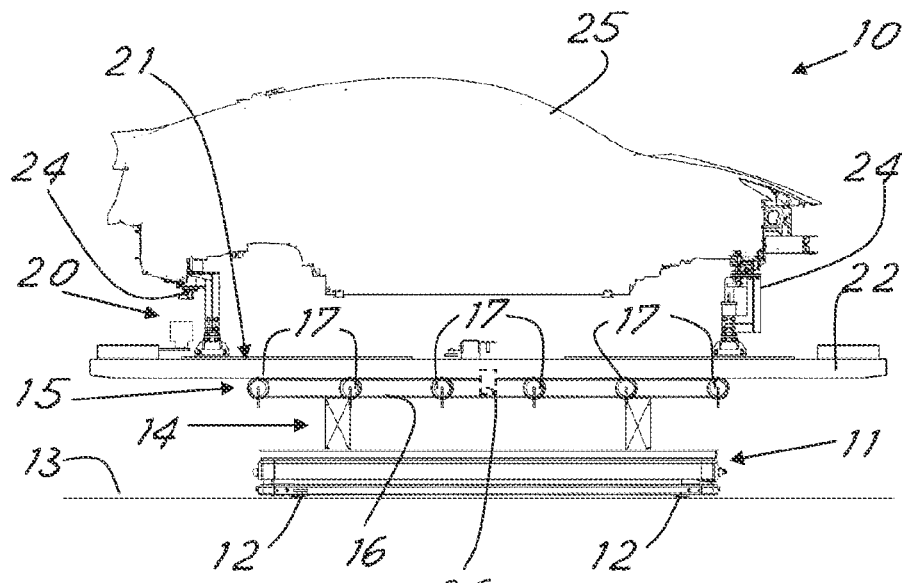
FIG. 1 shows a schematic side elevation view of an AGV trolley for a transport system according to the invention.

With reference to the Figures, FIG. 1 shows an AGV transport trolley designed in accordance with the invention and indicated overall by 10.

In a transport system according to the invention the trolleys 10 may obviously consist of a plurality designed to move within an industrial plant transporting objects 25. The trolleys may be autonomous and battery-powered.

The trolley 10 comprises a motorized handling platform 11 intended to move with wheels 12 on a floor 13. The motorized platform may be of a type known per se for AGV trolleys and will therefore not be described or shown in detail here. It may consist for example of a platform with electric motors which operate driving wheels and steering wheels under the control of an electronic system for controlling the trolley so as to follow transport paths automatically. The control system may be in communication also with a ground management system for the more or less centralized control of a plurality of trolleys 10 in the plant. In order to follow the transport paths, the motorization of the platform will allow the platform to move on its wheels forwards and backwards in the normal direction of movement of the trolley (namely to the right or the left as shown with the trolley in FIG. 1), which coincides with the longitudinal direction of the trolley, and to steer to the right and left.

Preferably the platform may also move in a direction transverse to the normal direction of movement. Furthermore, preferably the platform may also rotate about its vertical central axis. All these movements may be performed for example by providing four motorized steering wheels 12 underneath the platform.

Figure 2:
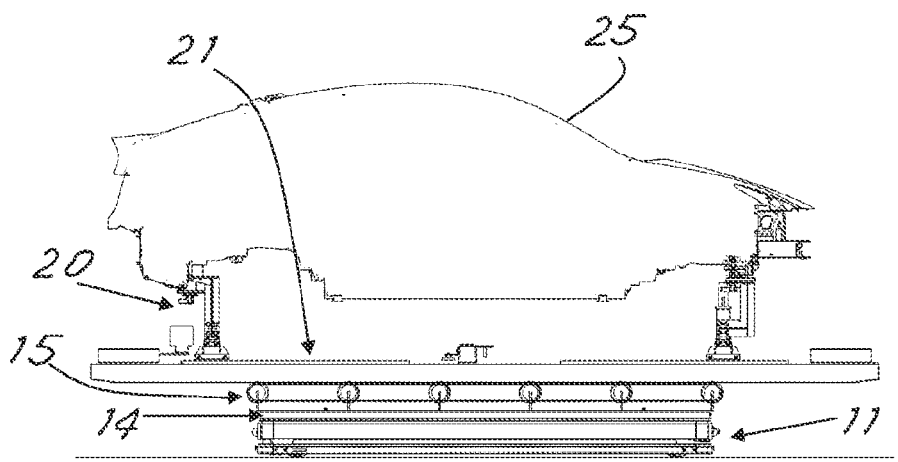
FIG. 2 shows a schematic view similar to FIG. 1, but with the transport trolley in a different operating position.
Figure 4:
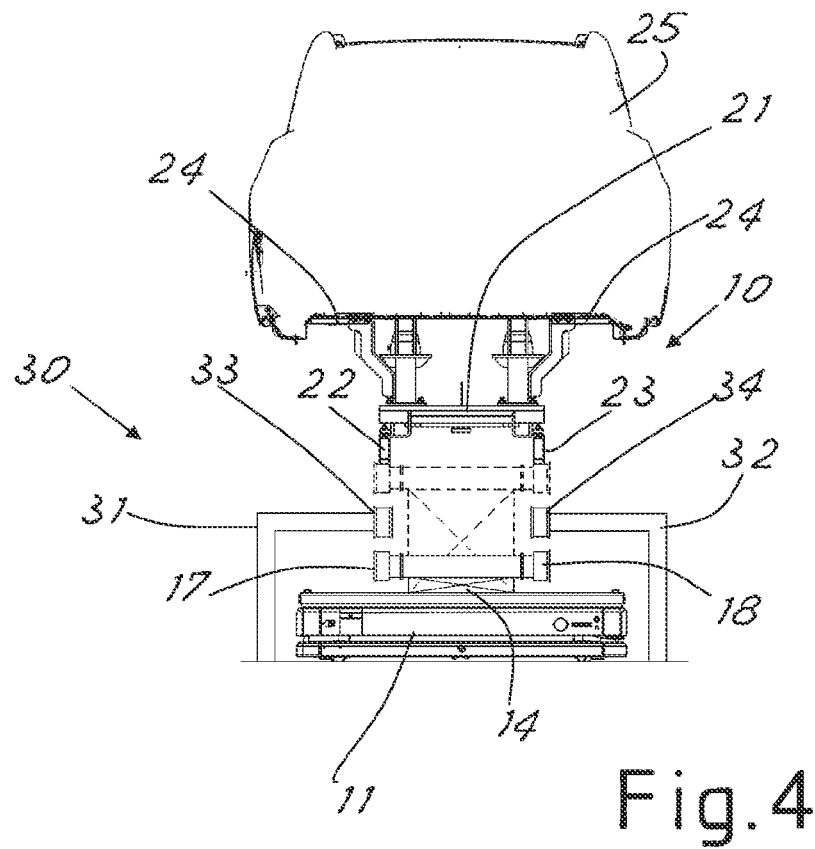
FIG. 4 shows a schematic transverse view of the trolley according to FIG. 1 during a loading and unloading operation in the plant according to the invention.

The trolley 10 also comprises a motorized lifting system 14 which supports a roller table 15 so as to move it on command between a raised position (shown in FIG. 1 and, in broken lines, in FIG. 4) and a lowered position (shown in FIG. 2 and, in continuous lines, in FIG. 4).

The lifting means 14 may be of any type known per se. For example, it may comprise a known parallelogram system with linear movement actuators which may also be formed by means of electric motors or pistons and electric pumps and suitable movement transmission systems, as may be easily imagined by the person skilled in the art based on the description provided here. If required, the lifting system may in this case also comprise a movement for inclining the roller table in the longitudinal and/or transverse direction with respect to the trolley.

Figure 3:
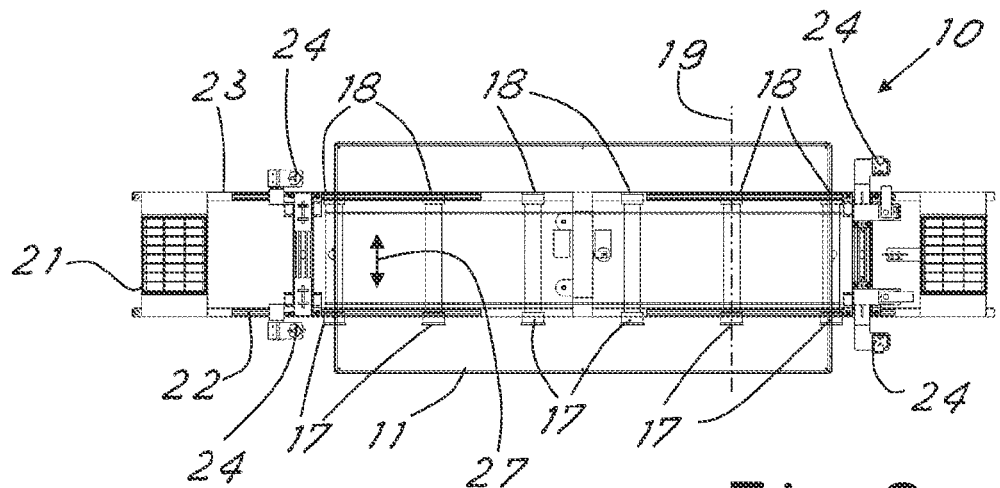
FIG. 3 shows a schematic plan view of the trolley according to FIG. 1.

As can be clearly seen also in FIGS. 3 and 4, the roller table 15 comprises a frame 16 which supports rollers 17, 18 intended to support a skid 20 in turn supporting an object 25 to be transported. As will become clear below, the rollers 17, 18 may be idle or all or only some of them may be motorized. In a preferred embodiment the rollers are at least partly motorized so as to allow the longitudinal centring and the loading/unloading of the skid, as will be clear below. The motorized rollers may be operated if necessary by a single rotation motor and by a suitable transmission which connects them all to this single motor, so that they all rotate in synchronism.

Advantageously, the rollers are arranged in two series of rollers projecting laterally from two opposite sides of the roller table.

The rollers on the two sides of the roller table have axes of rotation 19 which are parallel to each other and which are arranged transverse to the normal direction of forwards and backwards movement of the trolley.

The two series of rollers 17 and 18 are advantageously arranged spaced transversely with respect to the trolley so as to receive two runners 22 and 23 of the skid 20 which project underneath from a frame 21 of the skid, as can be clearly seen in FIGS. 3 and 4. The skid also comprises supports 24 which are intended to support the object 25 to be transported.

The object 25 may be advantageously, but not exclusively, a vehicle body, as schematically shown in the figures. In this case, the supports 24 are of a known type intended to engage in a manner known per se with the body to be transported.

As is clear to the person skilled in the art based on the description provided here, the transport system according to the invention may in fact be advantageously used in a factory or plant for the production of vehicles or vehicle parts. For example, it may be part of a known treatment, painting, assembly or other plant for vehicles or the like.

The number of rollers 17 and 18 and their relative arrangement in the two series will depend for example on the weight of the objects transported and the need to keep the skid stable during transport and during the loading and unloading operations, as will be described below.

Advantageously, the trolley may also comprise a motorized stop 26 which is operated so as to fasten the skid on the roller table 22, preventing it from moving on the rollers when not required (for example during movement of the trolley along its transport paths). The motorized stop may comprise, for example, a chain engaging inside a special seat in the skid.

If required, controlled displacement 27 of the rollers 15 in a direction transverse to the trolley may also be performed. This displacement may be preferably by a sufficiently small amount to keep in any case the centre of gravity of the roller table with its load inside the trolley ground supports. This transverse displacement may be useful, for example, in the case where it is required to align with precision the rollers and/or the skid with a skid support or transport system towards which the trolley moves, as will become clear below.

The transverse displacement 27 may be obtained, with a suitable motorization system known per se, for example a movement of the roller table 15 on the lifting system 14 or of the lifting system on the motorized platform 11. This latter solution may be preferable in order to keep the motorization system for performing transverse displacement within the platform or in any case close thereto.

With the trolley structure according to the invention it is possible to achieve optimum management of objects on skids.

For example, the vertical movement of the roller table of the trolley allows easy loading and unloading of a skid, if necessary combining it also with the motorized rollers of the roller table, as will become clear below.

The vertical movement may allow alignment of the roller table with the transport surface of a sequential conveyor, so as to allow transfer of one skid between trolley and conveyor owing to the displacement of the skid on the trolley rollers. The vertical movement of the roller table may also allow the trolley to place the skid on supports or to remove the skid from supports.

It is thus possible to achieve AGV transportation of objects on skids without having to transfer the objects from the AGV transport device to the skids and vice versa, but with easy management directly of objects on the skids.

A transport system for industrial plants according to the invention may also comprise a plurality of trolleys 10, a plurality of skids 20 and suitable stations 30 for loading/unloading skids onto and from trolleys.

A loading and unloading station may be, for example, a station for temporary parking of a skid, with or without an object thereon, or be located at the end or at the start of a sequential conveyor for skids and comprise a station in which a trolley aligns its roller table with this sequential conveyor so as to be able to unload onto the sequential conveyor a skid or receive a skid from the sequential conveyor.

Figure 5:
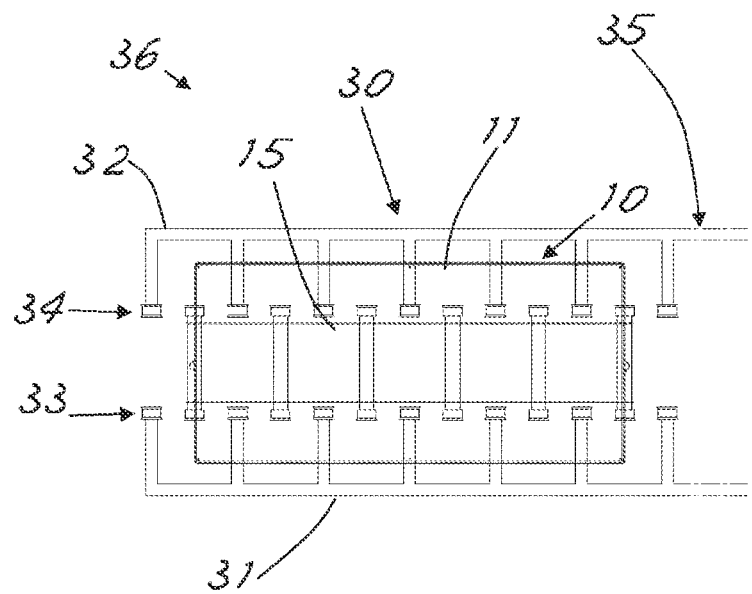
FIGS. 5 and 6 show schematic plan views of the trolley according to FIG. 1 during loading and unloading operations in two different loading and unloading stations of the plant according to the invention.

FIGS. 4 and 5 show, in particular, a trolley 10 in a loading and unloading station (denoted generally by 30) of the system according to the invention. In this station 30 there may be advantageously lateral supports 31 and 32 intended to support the skid 20, preferably on the skid runners 22, 23.

As is clear from FIG. 4, supporting of the skid on the lateral supports 31, 32 may be performed simply by means of the vertical movement of the roller table of the trolley 10 which arrives at the station 30 and is inserted between these two lateral supports 31, 32 with the roller table 15 raised, the roller table being then lowered in order to rest the skid on the supports 31, 32 of the station.

Picking up of a skid present on the supports in the station by means of a trolley may be performed by means of a reverse movement, as may be now easily imagined by the person skilled in the art.

Advantageously, the lateral supports are shaped so as to receive between then the motorized platform 11 of the trolley, which may be wider than then roller table, and be closer together above the platform so as to be aligned with the rollers of the roller table 15 and/or with the runners of a skid on the trolley. The station 30 may be designed so as to have the lateral supports 31, 32 which may or may not comprise two corresponding series of support rollers 33 and 34 for the skid runners.

The schematic plan view of FIG. 5 shows a version of the station 30 provided with lateral supports 31, 32 having support rollers 33, 34.

Advantageously, as can be clearly seen in FIG. 5, the rollers 33, 34 of the station are arranged so as to be inserted in the empty spaces between the rollers 17, 18 of the trolley (formed projecting along the sides of the frame of the roller table) so as to be able to be aligned, in a vertical plane, with the runners of a skid present or to be deposited on a trolley, allowing at the same time the aforementioned vertical movement of the roller table.

Advantageously, the rollers of the station consist of a number at least equal to that of the trolley, so as to maintain for a skid placed thereon the same support capacity as the trolley.

Advantageously, the station 30 with the rollers may be at the start or at the end of sequential skid conveyor 35 (known per se and therefore not further shown or described here) of the overall transport plant according to the invention. In this way, the trolley may be inserted inside the station 30 and, for example, a skid unloaded onto the support rollers 33, 34 and then moved towards the conveyor 35, or, on the contrary, the trolley may be inserted in the station 30 and, for example, a skid which has arrived onto the support rollers 33, 34 by means of the conveyor 35 may be removed from the support rollers 33, 34. Motorized support rollers 33, 34 may be provided for the at least partial movement of the skid between the support rollers 33, 34 and the conveyor 35, or the rollers of the trolley, if motorized, or a combination of the two systems may be used.

If the skid is longer than the trolley, as shown in FIGS. 1-3, the vertical downwards movement of the roller table may be sufficient to rest one end of the skid projecting from the trolley on the start of the conveyor, which is thus able to take up the skid and move it along the associated travel path.

Similarly, the pushing force of a conveyor 35 may cause a skid to project by a sufficient amount inside the station 30 so as to be taken up by a trolley.

Basically FIG. 5 shows an example of the components of a part of a transport system according to the invention (generally indicated by 36 in FIG. 5), with a trolley 10, a skid 20, a station 30 and a sequential skid conveyor 35. These components may obviously be combined in any number, type and position in the transport system 36 according to the invention, depending on the specific needs of an industrial plant served by the transport system.

Figure 6:
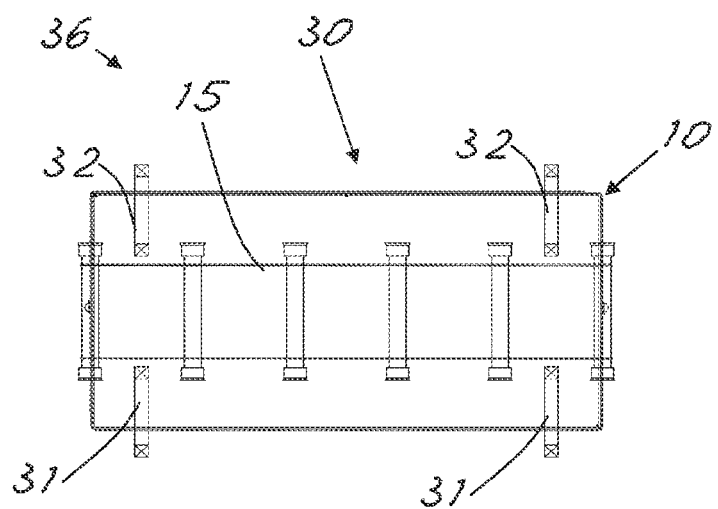

The schematic plan view of FIG. 6 shows a version of the station (indicated for simpler illustration by 30 again) provided with lateral supports 31, 32 without any support rollers 33, 34.

In this version, the station 30 functions simply as a skid parking station, with the trolley 10 which is suitably inserted between the supports 32, 32 of the station and places or picks up a skid owing to the vertical movement of the trolley roller table. The station 30 may be in this case a transit loading and unloading station, namely a skid may be temporarily parked by a trolley and then this skid may be picked up by another trolley or by another suitable transport system (for example a known overhead pick-up device). The station 30 may also form part of a processing station (for example finishing or assembly station) in which the object on the skid undergoes processing operations, before continuing to other destinations.

As shown in FIG. 6, if in the station 30 no horizontal movement of the skid is envisaged, as instead described above for the station 30 in FIG. 5, the lateral supports 31, 32 may also only be four in number so as to provide support for the skid runners only in the vicinity of the ends of these runners. This simplifies the structure of the station and moreover allows a free space to be left around the skid and the object thereon for any processing operations, pick-up or delivery manoeuvres, etc.

At this point it is clear how the objects of the invention have been achieved, providing a transport system which allows the AGV-type transport system to be combined effectively with skid-type transport systems. Moreover, with this system it is possible to realize simple and low-cost loading/unloading stations which ensure a high degree of flexibility during use. The system according to the invention may also easily be interfaced with or comprise sequential skid transport systems together with AGV transport systems.

Obviously, the above description of an embodiment applying the innovative principles of the present invention is provided by way of example of these innovative principles and must therefore not be regarded as limiting the scope of the rights claimed herein.

For example, depending on the motorization of the trolley movement, the said trolleys may also enter into and/or exit the stations 30 in directions different from the longitudinal direction. For example, in the case where the trolleys have the possibility of moving transversely, they could enter into the station and/or exit from the station also in this direction.

All the motorized parts of the trolley may be operated by the computerized system for controlling the trolley, as may be now easily imagined by the person skilled in the art on the basis of the description of the invention provided here. The trolley may obviously also comprise sensors (position sensors, proximity sensors, etc.) as is normal for the known AGV transport systems.

A transport system for industrial plants realized in accordance with the invention may obviously comprise any number of trolleys, loading and unloading stations and sequential conveyors depending on the specific requirements of the plant in which it is used. Moreover, in the plant some trolleys 10 may have only some of the movements described above, in a varying combination. For example, some trolleys could be provided with the lateral displacement of the roller table, while others could be without it, or this displacement could be completely absent, if not required, and/or some trolleys could have motorized trolleys in combination or not with the lateral displacement, etc. If need be, here "transport system" may be understood as meaning also only the trolley 10 according to the invention.

The invention claimed is:

1. A transport system for an industrial plant, the transport system comprising:
   at least one trolley configured to autonomously transport an object;
   at least one skid configured to support the object; and
   at least one station configured to load the at least one skid onto the at least one trolley and configured to unload the at least one skid off of the at least one trolley;
   wherein the at least one trolley comprises:
   an automated/automatic guided vehicle (AGV)-type motorized handling platform;
   a motorized lifting system; and
   a roller table equipped with first rollers;
   wherein the roller table is supported on the motorized lifting system so as to move on command between a raised position and a lowered position on the at least one trolley,
   wherein the roller table is configured to support the at least one skid resting on the first rollers, and
   wherein at least two of the first rollers are motorized.

2. The transport system of claim 1, wherein the first rollers are arranged in two series projecting from opposite sides of the roller table.

3. The transport system of claim 1, wherein the roller table is further configured to be displaced laterally on command with respect to the motorized handling platform.

4. The transport system of claim 1, wherein the at least one station comprises supports for the at least one skid, and
   wherein the at least one trolley is configured to be inserted between the supports in order to pick up the at least one skid from the supports, using vertical movement of the roller table from the lowered position to the raised position, or to place the at least one skid on the supports, using the vertical movement of the roller table from the raised position to the lowered position.

5. The transport system of claim 4, wherein the supports are configured to accommodate runners of the at least one skid.

6. The transport system of claim 4, wherein the supports comprise second rollers configured to provide sliding support for the at least one skid.

7. The transport system of claim 6, wherein the second rollers are configured to alternately fit into spaces between the first rollers in the at least one station during the vertical movement between the raised position and the lowered position.

8. The transport system of claim 1, further comprising:
   at least one sequential skid conveyor;
   wherein the at least one sequential skid conveyor starts or ends at the at least one station so as to sequentially unload the at least one skid at the at least one station or to sequentially load the at least one skid from the at least one station.

9. A trolley for autonomous transport of an object, the trolley comprising:
   an automated/automatic guided vehicle (AGV)-type motorized handling platform;
   a motorized lifting system above the motorized handling platform; and
   a roller table equipped with first rollers;
   wherein the roller table is supported on the motorized lifting system so as to move on command between a raised position and a lowered position on the trolley, and
   wherein the roller table is configured to support a skid resting on the first rollers and, in turn, supporting the object.

10. The trolley of claim 9, wherein the first rollers are arranged in two series projecting from opposite sides of the roller table.

11. The trolley of claim 9, wherein the roller table is configured to be displaced laterally on command with respect to the motorized handling platform.

12. The trolley of claim 9, further comprising:
    a stop configured to control locking of the skid on the roller table.

13. The trolley of claim 9, wherein at least one of the first rollers is motorized.

14. The trolley of claim 9, wherein at least two of the first rollers are motorized.

15. A transport system for an industrial plant, the transport system comprising:
    at least one trolley configured to autonomously transport an object;
    at least one skid configured to support the object;
    at least one first station configured to load the at least one skid onto the at least one trolley; and
    at least one second station configured to unload the at least one skid off of the at least one trolley;
    wherein the at least one trolley comprises:
    a motorized handling platform;
    a motorized lifting system; and
    a roller table equipped with first rollers;
    wherein the roller table is supported on the motorized lifting system so as to move on command between a raised position and a lowered position on the at least one trolley, and
    wherein the roller table is configured to support the at least one skid resting on the first rollers.

16. The transport system of claim 15, wherein the at least one first station is further configured to unload the at least one skid off of the at least one trolley.

17. The transport system of claim 15, wherein the at least one second station is further configured to load the at least one skid onto the at least one trolley.

18. The transport system of claim 15, wherein the roller table is further configured to be displaced laterally on command with respect to the motorized handling platform.

* * * * *